OR    3,746,427

United State
Foster

[11] 3,746,427
[45] July 17, 1973

[54] ACOUSTO-OPTICAL SYSTEM WITH SIMPLIFIED OPTICS

[75] Inventor: Leigh Curtis Foster, Atherton, Calif.

[73] Assignee: Zenith Radio Corporation, Chicago, Ill.

[22] Filed: Oct. 15, 1971

[21] Appl. No.: 189,664

[52] U.S. Cl. .............................................. 350/161
[51] Int. Cl. ............................................ G02b 1/28
[58] Field of Search ...................... 350/160 R, 161

[56] References Cited
UNITED STATES PATENTS
3,435,228  3/1969  Gordon ............................. 350/161
3,418,626  12/1968  Farr et al. ...................... 350/160 R

*Primary Examiner*—Ronald L. Wibert
*Assistant Examiner*—J. P. McGraw
*Attorney*—John J. Pederson and John H. Coult

[57] ABSTRACT

In the preferred embodiment of disclosed acousto-optical systems, a collimated beam of coherent light is projected from an entrance pupil through a beam of sound to an exit pupil. The light beam is diffracted by the sound which propagates transversely to the light beam. A cylinder lens is disposed at the entrance pupil to spread the light in a direction that is parallel to the propagation of the sound. Confocal with the cylinder lens is a spherical lens that recollimates the light in the direction of sound propagation while at the same time focusing it in a direction perpendicular to the sound beam. Another spherical lens, located beyond the sound beam, serves to concentrate the diffracted light beam in the direction of sound propagation, and a further cylinder lens system, disposed at the exit pupil and confocal with the second spherical lens, recollimates the light beam.

3 Claims, 5 Drawing Figures

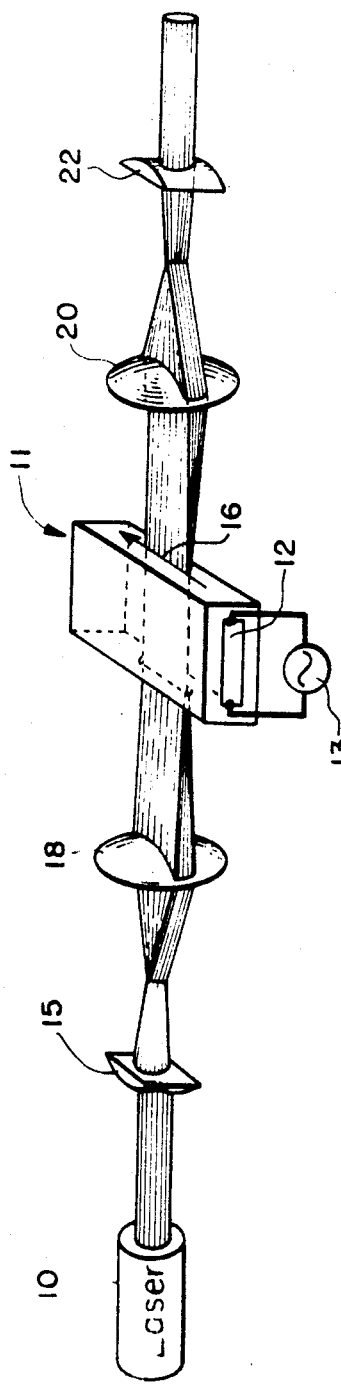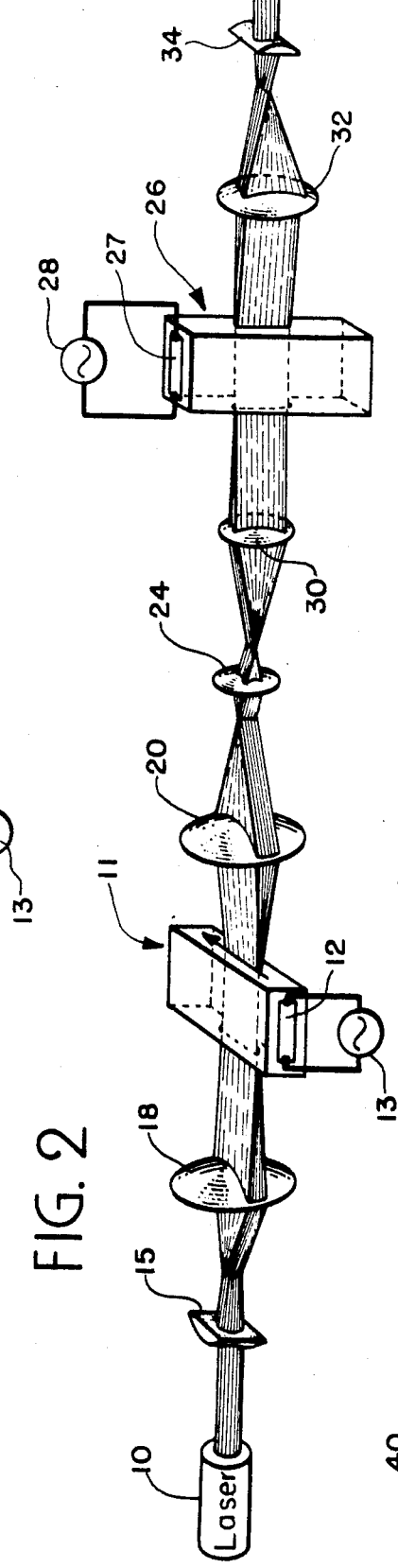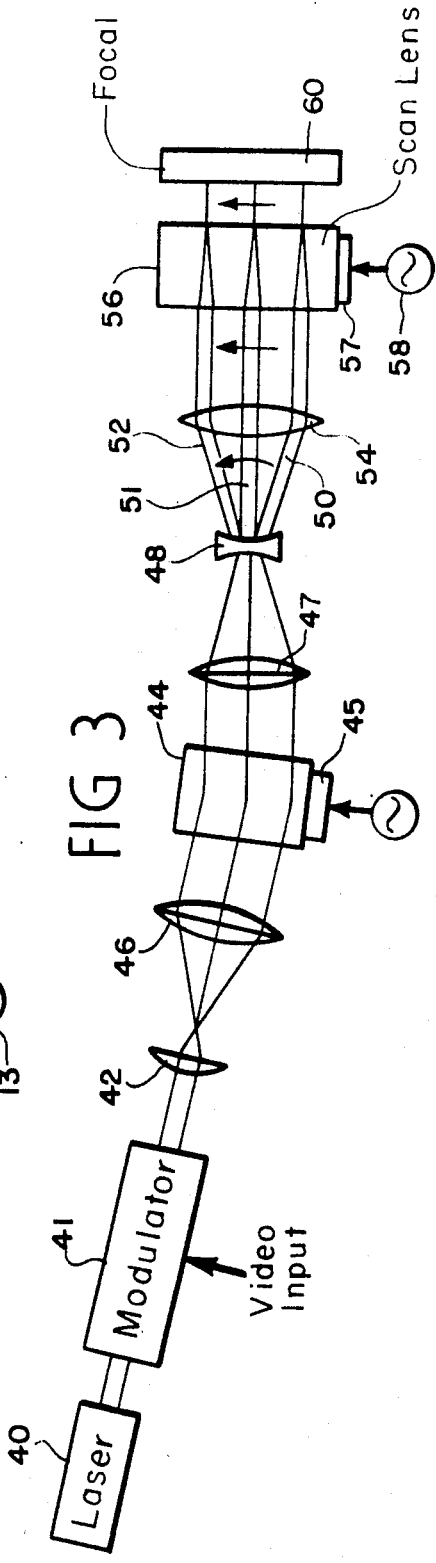

ACOUSTO-OPTICAL SYSTEM WITH SIMPLIFIED OPTICS

The present invention pertains to a light-beam deflection system. More particularly, it relates to improved optical apparatus for appropriately shaping and reshaping a beam of light which is diffracted by acoustic or sound waves propagated transversely to the light beam.

Acoustic Bragg diffraction has been successfully utilized for the purpose of causing a laser beam to be repetitively deflected so as to scan an image raster. One such system is described by Korpel et al. in an article entitled "A Television Display Using Acoustic Deflection and Modulation of Coherent Light," joint issue of *IEEE Proceedings*, Volume 54, pp. 1429–1437, and *Applied Optics*, Volume 5, pp. 1667–1675 (1966). In that type of approach, the sound field often is in the form of a sheet beam in order to preserve sound power. For efficient interaction of the light, the light beam also should have a sheet-like cross-section with its longer dimension being in the direction of sound propagation. Accordingly, such prior systems have employed a telescope, having a cylindrical eye piece located at the entrance pupil, for expanding the light beam diameter and followed by a large cylinder lens for focusing the light in a direction perpendicular to the sheet beam of sound. A reciprocal cylindrical telescope collects the diffracted light and reshapes it to a narrow pencil beam.

Having to accept the expanded beam width, the large cylinder lenses are extremely expensive when corrected to compensate cylindrical aberration. Consequently, it has been customary to employ uncorrected cylinder lenses, while minimizing the effects of aberration by employing higher F numbers than otherwise would be utilized. In turn, this means selecting a cylinder lens that exhibits a greater focal length than would desirably be chosen from the standpoint of minimizing overall length of the optical system. In a typical example utilizing a helium-neon laser beam having a diamter of two millimeters, the focal length of each large cylinder lens is approximately 25 centimeters as a result of which the overall length of the optical diffraction system is of the order of eighty centimeters. For a similar arrangement in which scanning is accomplished in both the horizontal and vertical directions, the overall length approximates 130 centimeters.

Accordingly, it is a general object of the present invention to provide new and improved acousto-optical diffraction systems in which the overall system length is significantly decreased.

Another object of the present invention is to provide a new and improved acousto-optical diffraction system in which the cost of cylinder lenses is substantially reduced.

The invention thus pertains to an acousto-optical system wherein a collimated beam of coherent light is projected from an entrance pupil to an exit pupil and in which the light beam is diffracted by a beam of sound propagating transverse to the light beam intermediate the pupils. A cylinder lens is disposed at the entrance pupil and oriented to spread the light beam in a direction that is parallel to the direction of propagation of the beam of sound. Confocal with the cylinder lens is a spherical lens to recollimate the light beam in the direction of sound propagation, while focusing the light beam in a direction that is perpendicular to the sheet beam. Finally, the system includes means disposed beyond the sound beam for reshaping the light beam, preferably, this reshaping means is a reciprocal combination of a spherical lens followed by a cylinder lens system with the latter being located at the exit pupil.

The features of the present invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIG. 1 generally-schematic but partially perspective view of a Bragg diffraction light-beam scanning system;

FIG. 2 is a similar view of a light-beam scanning system expanded in function to include scanning in coordinate directions;

FIG. 3 is a diagrammatic view of a different form of light scanning system;

Figure 4:
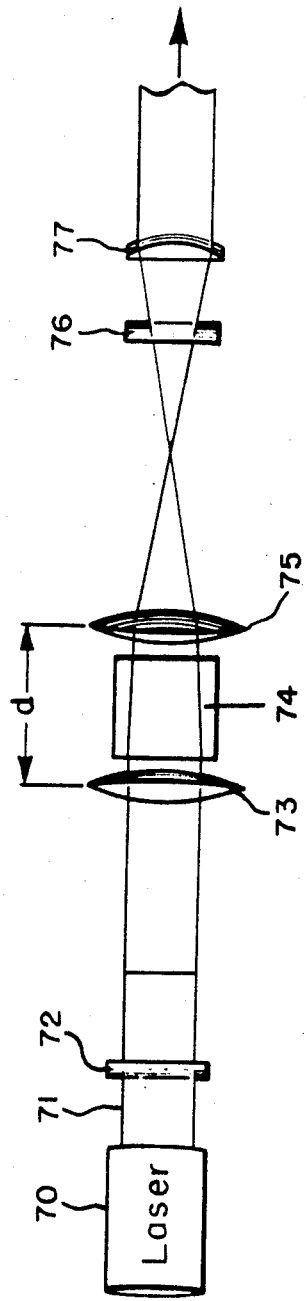
FIG. 4 is a schematic plan view of a modified scanning system including a further improvement that also may be incorporated into the system of FIGS. 1–3.

In FIG. 1, a laser 10 projects a collimated beam of coherent light along a path through the illustrated acousto-optical system. Intermediate the length of that system is a Bragg diffraction cell 1 that serves to diffract, and hence deflect, the incoming beam of light at an angle which is a function of acoustic or sound waves that propagate along a path transverse to that of the light beam. At television scanning frequencies, the medium in which the sound waves propagate typically is water, so that cell 11 may simply take the form of a container for the water that has at least its sidewalls transparent to the light. Disposed at one end of cell 11 is a piezoelectric transducer 12 which responds to signals from a source 13 for launching the sound waves. Transducer 12 is elongated in the direction of the light beam so as to produce a sheet beam of the sound waves, that is, a sound beam which is characterized by a cross-section that is wide in the direction of light travel and more narrow in the direction perpendicular to the plane of diffraction or deflection.

Disposed at the entrance pupil of the optical system is a cylinder lens 15 oriented to spread the narrow, pencil-like beam from laser 10 in a direction parallel to the direction of propagation of the sheet beam of sound that is indicated in FIG. 1 by arrow 16. A spherical lens 18 confocal with cylinder lens 15 serves to recollimate the light beam in the direction of sound propagation. At the same time, spherical lens 18 also focuses the light beam in a direction that is perpendicular to the sheet beam of sound to form a waist centrally within the sound beam. Consequently, within cell 11, the comparatively wide and flat beam of light interacts, over a maximum area for efficiency, with the similarly flat and wide sound beam.

A reciprocal lens arrangement beyond cell 11 serves to reshape the light beam into its original pencil-like form. Thus, another spherical lens 20 collects the diffracted light emerging from cell 11 and concentrates that diffracted light beam again in the direction of sound propagation. Finally, another cylinder lens 22, disposed at the exit pupil of the system and confocal with spherical lens 20, is oriented so as to recollimate the light beam.

In an exemplary system utilizing a 2-millimeter laser beam, lenses 15 and 22 may each have a focal length of 1.4 centimeters while the focal length of spherical lenses 18 and 20 is 14 centimeters each. Consequently, the total length of the optical system of FIG. 1 is only about 59 centimeters, compared to the approximately 80-centimeter length mentioned in the introduction with respect to prior systems that utilize cylindrical telescopes for expanding the beam width. When using instead but a 1-millimeter laser beam width, a cylinder lens focal length of 0.5 centimeters and spherical lens focal lengths of 10 centimeters may be used, so that the overall system length is reduced still further to only about 41 centimeters. Instead of requiring an F number of at least 14 as required in prior systems in order to accommodate aberration, the system of FIG. 1 permits the use of optics exhibiting F numbers of between five and seven. Further, being located at the entrance and exit pupils where the light beam diameter is the smallest, the only cylinder lenses may correspondingly be small and, hence, less costly.

FIG. 2 illustrates a system representing a modification of FIG. 1 to include, in cascade with that system, a second acousto-optical system serving also to deflect or diffract the light beam in a direction orthogonal to that within the first part of the arrangement. Thus, the beam of light from laser 10 again traverses cylinder lens 15 and spherical lens 18 which serve together to form the light beam into a wedge focused at the center of diffraction cell 11. Beyond cell 11, spherical lens 20 acts as in the system of FIG. 1 to concentrate the diffracted light beam in the direction of sound propagation.

As so far described, the system of FIG. 2 is identical to that of FIG. 1, and cylinder lens 22 of that figure could be placed at the exit pupil for the purpose of recollimating the light beam into its original shape. In the case of FIG. 2, however, it is desired that the exit lens from the first half of the optical system also serves as the entrance lens of the second part of the system wherein diffraction of the light beam occurs in a direction orthogonally related to the direction of diffraction effected by cell 11. Accordingly, a spherical lens 24 confocal with lens 20 is provided and functions, in effect, to recollimate the light concentrated by lens 20 while at the same time spreading the light beam in a direction parallel to the direction of sound propagation in a second diffraction cell 26. Cell 26 includes a transducer 27 which responds to an input signal source 28 for launching a sheet beam of sound along a path oriented in this case in the vertical direction, orthogonally relative to the horizontal direction of sound propagation in cell 11. Thus, spherical lens 24 acts like cylinder lens 22 with respect to the arriving light concentrated in the horizontal direction, while at the same time it acts like a second cylinder lens rotated by 90° so as to cause the light to spread in the vertical direction. Confocal with lens 24 is still another spherical lens 30 which recollimates the light beam in the vertical direction of propagation in cell 26, while at the same time focusing the light beam in a direction perpendicular to that sheet beam of sound and at the center of the width thereof. Beyond cell 26, a final cylinder lens 32, like lens 20 but operating upon a sheet beam of light rotated by 90°, concentrates the light diffracted by cell 26 in the direction of sound propagation in that cell. Finally, a cylinder lens 34, rotated 90° with respect to cylinder lens 15, is confocal with spherical lens 32 and is oriented once more to recollimate the light beam into its original pencil-like shape.

As can be seen, the dual-deflection system of FIG. 2 has all of the advantages mentioned above with respect to the system of FIG. 1 in terms of decreased optical system overall length, reduced lens cost, and smaller numbers of lenses. In addition, the FIG. 2 system achieves coordinate deflection in the second direction while as to one component, lens 24, combining therein functions pertaining to the two different portions of the overall system.

In FIG. 3, a beam of light from a laser 40 is projected through a modulator 41 to a cylinder lens 42 disposed at the entrance pupil of another Bragg diffraction scanning system. Again, the system of FIG. 3 includes a diffraction cell 44 having a transducer 45 to which the scanning signals are supplied so as to develop a sheet beam of acoustic or sound waves within cell 44. Corresponding to the system of FIG. 1, a spherical lens 46 confocal with cylinder lens 42 is provided for the purpose of recollimating the light spread by the latter. Also similarly, the diffracted light emerging from cell 44 is concentrated by a spherical lens 47 toward a following cylinder lens 48. As shown, a video signal is fed to modulator 41 for the purpose of modulating the intensity or brightness of the light beam in correspondence with picture information.

In the particular embodiment of FIG. 3, the exit cylinder lens 48 is spaced beyond spherical lens 47 so as to be located approximately at the focal point of lens 47. In addition, lens 48 is of the negative or double-concave variety. In consequence of its location near the exit pupil and being oriented relative to the direction of concentration of the light beam so as to recollimate the light beam in the direction of sound propagation in cell 44, cylinder lens 48 also serves to increase the angle of diffraction of the light beam effected by cell 44. That is, with the scan signal input to transducer 45 repetitively varying throughout a selected frequency range, the light beam is caused, by the diffraction action as well as the scan multiplication effected by cylinder lens 48, successively to traverse a plurality of angularly related paths of which three are represented by paths 50, 51 and 52 in FIG. 3. Following cylinder lens 48 is a final spherical lens 54 which serves to redirect the light from the different angularly related paths into parallel paths, which in turn are directed through another Bragg diffraction cell 56 in which a sheet beam of acoustic waves is launched by a transducer 57 which responds to a signal from a source 58.

Diffraction cell 56 may be constructed and operated as described in detail in the copending application of L. Curtis Foster, Ser. No. 872,559, filed Oct. 30, 1969, and serves as a scanning lens to accurately focus the light beam in any of the different plurality of parallel incident paths throughout the scanning pattern upon a focal plane 60. That is, the scanning lens maintains focus throughout the raster width even though the light beam may travel a longer distance toward one edge of the raster than when at the center. The present application is concerned only with operation of the portion of the arrangement between the entrance to and exit from the optical system that includes diffraction cell 44.

As specifically described in connection with FIGS. 1 and 2, the spherical lenses on either side of the diffraction cells are confocal so that the light beam is focused to a narrow waist in the center of the diffraction cell. This often is unnecessary and may be dispensed with by including an additional cylinder lens in the lens system at the exit pupil. Again being at or near the pupil, the added lens is small and may be obtained at comparatively low cost. The principal advantage is that of achieving a still further reduction in the overall length of the deflection system. This is achieved by placing the two spherical lenses immediately adjacent to the diffraction cell. While any of the systems of FIGS. 1–3 may be modified to include this feature, it is specifically illustrated in the system of FIGS. 4 and 5.

Accordingly, a laser 70 projects a beam of light depicted by its envelope 71. In succession, the light beam traverses an entrance-pupil cylinder lens 72, a first spherical lens 73, an acoustic diffraction cell 74, a second spherical lens 75 and an exit pupil lens system composed of cylinder lenses 76 and 77. A sound beam propagating in the plane of FIG. 5 is developed by a transducer 78 driven by a source 79. Cylinder lenses 72 and 76 are oriented to act on the light in the plane of FIG. 5 and thus in the direction of sound propagation. On the other hand, cylinder lens 77 is oriented to act on the light in the plane of FIG. 4 which is at a right angle to the direction of sound propagation.

Figure 5:
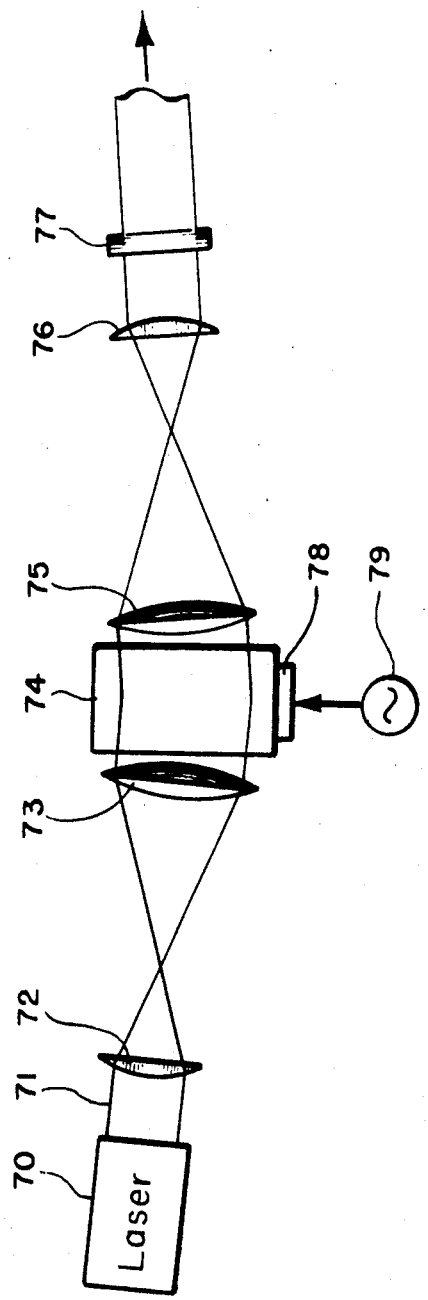
FIG. 5 is a side elevational view of the system of FIG. 4.

In operation, lens 72 has essentially no effect in the plane of FIG. 4 but in the coordinate plane of FIG. 5 it directs the light so that upon emergence from lens 73 the light is collimated in the latter plane. In the FIG. 4 plane, lens 73 merely effects some convergence of the as yet unfocused light beam. Lens 75 serves in the plane of FIG. 5 to focus the light so that it fills lens 76 which, in turn recollimates the light. In the plane of FIG. 4, lens 75 effects additional focusing of the light so that it reaches a focal point ahead of the second focal point shown in FIG. 5. Lens 76 has essentially no effect in the plane of FIG. 4. However, lens 77 serves in the latter plane to recollimate the light; it is located so that the light beam cross-over occurs at its focal length. On the other hand, lens 77 has essentially no effect in the plane of FIG. 5. Finally, it may be noted that the effective focal length f of lenses 73 and 75, separated by a distance d, is given by the expression:

$$1/f = 1/f_{73} + 1/f_{75} - d/f_{73}f_{75}$$

In all four of the embodiments presented, cylinder lenses are located at, or at least near, the entrance and exit pupils of an optical system for a Bragg diffraction light beam deflector. While a wide sheet-like beam of light is utilized within the diffraction cell itself, the light beam at both ends of the optical system is essentially of pencil-like character. By virtue of the features common to the four different embodiments, the total number of lenses may be minimized, the size of the cylinder lenses, the most expensive lens components in any of the systems, is reduced, and the overall optical system length likewise is decreased.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In an acousto-optical system wherein a collimated beam of coherent light is projected from an entrance pupil to an exit pupil and in which said light beam is diffracted by a beam of sound propagating transversely to the light beam intermediate said pupils, optical apparatus comprising:
   a cylinder lens disposed at said entrance pupil and oriented to spread said light beam in a direction parallel to the propagation of said sound beam;
   means including a spherical lens confocal with said cylinder lens for recollimating said light beam in the direction of said propagation and focusing the light beam in a direction perpendicular to said sound beam;
   and means disposed beyond said sound beam for reshaping said light beam, including:
   a second spherical lens located between said sound beam and said exit pupil to concentrate the diffracted light beam in the direction of sound propagation;
   and a negative cylinder lens disposed near said exit pupil beyond said second spherical lens and oriented to recollimate said light beam in the direction of sound propagation while increasing the angle of diffraction effected by said sound beam.

2. In an acousto-optical system wherein a collimated beam of coherent light is projected from an entrance pupil to an exit pupil and in which said light beam is diffracted by a beam of sound propagating transversely to the light beam intermediate said pupils, optical apparatus comprising:
   means disposed ahead of said sound beam for shaping said light into a sheet-like cross-section having its longer dimension in the direction of sound propagation;
   a spherical lens located between said sound beam and said exit pupil to concentrate the diffracted light beam in the direction of sound propagation;
   and means including a cylinder lens system disposed at said exit pupil and confocal with said spherical lens for recollimating said light beam, comprising:
   a first cylinder lens having power in the plane of said sound beam for recollimating said light beam in that plane;
   and a second cylinder lens having power in a direction transverse to said sound beam for recollimating said light beam in that direction.

3. For use in apparatus for operating on a collimated input laser beam including a Bragg acousto-optic cell having a predetermined direction of sound propagation, an optical system comprising:
   anamorphic first lens means in said input beam for forming said input beam into an elongated focus oriented orthogonal to said direction sound propagation;
   second lens means comprising a pair of spaced non-anamorphic components, one on each side of the acousto-optic cell, for forming an elongated image of said elongated focus at a first focal distance from said second lens means, said second lens means converging light in the plane of sound propagation in said cell to a second focus at a second focal distance from said second lens means which is less than said first focal distance;
   a first cylinder lens having power in the plane of said sound beam and spaced a focal length away from said image of said elongated focus for recollimating said light beam in said plane of sound propagation; and
   a second cylinder lens having power in a plane orthogonal to said sound beam and spaced a focal length away from said second focus for recollimating said light beam in said orthogonal plane.

* * * * *